United States Patent [19]

Fujii

[11] Patent Number: 5,253,233
[45] Date of Patent: Oct. 12, 1993

[54] METHOD OF MAKING A MAGNETO-OPTICAL RECORDING MEDIUM THAT INCLUDES A LIGHT INTERFERENCE LAYER HAVING SPECIFIED CHARACTERISTICS

[75] Inventor: Eiichi Fujii, Yokohama, Japan

[73] Assignee: Canon Kabushiki Kaisha, Tokyo, Japan

[21] Appl. No.: 758,283

[22] Filed: Aug. 28, 1991

Related U.S. Application Data

[63] Continuation of Ser. No. 391,643, Aug. 7, 1989, abandoned, which is a continuation of Ser. No. 940,344, Dec. 11, 1986, abandoned.

[30] Foreign Application Priority Data

Dec. 17, 1985 [JP] Japan ................... 60-281928

[51] Int. Cl.$^5$ ............................................. G11B 13/04
[52] U.S. Cl. ........................... 369/13; 369/275.4;
369/275.5; 369/275.2; 369/286
[58] Field of Search ........... 369/13, 14, 110, 275.4,
369/275.5, 275.2, 286, 288; 360/59, 114;
365/122

[56] References Cited

U.S. PATENT DOCUMENTS

| | | | |
|---|---|---|---|
| 3,801,966 | 4/1974 | Terao | 250/211 R |
| 4,466,035 | 8/1984 | Connell et al. | 360/114 |
| 4,558,440 | 12/1985 | Tomita | 360/59 |
| 4,569,035 | 2/1986 | Tomita | 365/122 |
| 4,569,881 | 2/1986 | Freese et al. | 369/13 |
| 4,658,388 | 4/1987 | Ishiwatari et al. | 369/13 |
| 4,680,742 | 7/1987 | Yamada et al. | 369/13 |

FOREIGN PATENT DOCUMENTS 2095886 10/1982 United Kingdom ............. 360/114

OTHER PUBLICATIONS

Egashira et al, "Kerr-effect enhancement and improvement of readout characteristics in MnBi film memory", Journal of Applied Physics, vol. 45, No. 8, Aug. 1974, pp. 3643–3648.

Ishiwata, et al., "Manuscripts Prepared for the National Meeting of the Electrical Society, Apr. 1985", pp. 1 through 7, translation of pp. S.3-9 through S.3-12.

Primary Examiner—Hoa Nguyen
Attorney, Agent, or Firm—Fitzpatrick, Cella, Harper & Scinto

[57] ABSTRACT

A method of making a magneto-optical recording medium for having information magnetically recorded on its recording layer read out by magneto-optical effect by applying a reproducing light beam emitted from a semiconductor laser thereto and detecting the reflected light beam thereof by means of a photodetector having no self-multiplication characteristic or a photodetector having a self-multiplication characteristic. The method includes the steps of selecting a recording layer comprising a magnetic film; selecting a light interference layer comprising a dielectric; defining the thickness of the light interference layer by:

$$d = \frac{\lambda}{2N}\left(\frac{X}{8} + Y\right)$$

where d is the film thickness of the light interference layer, N is the refractive index of the light interference layer and λ is the wavelength of the reproducing light, Y is selected from 0, 1 and 2, and $1 \leq X \leq 3$ or $5 \leq X \leq 7$ in the first case or $2 \leq X \leq 3.9$ or $4.1 \leq X \leq 6$ in the second case, respectively; selecting a light reflecting layer and arranging the recording layer, the light interference layer and the light reflecting layer in succession along one direction to form the magneto-optical recording medium.

12 Claims, 3 Drawing Sheets a: CURVE SHOWING 55dB OF C/N VALUE
b: CURVE SHOWING 50dB OF C/N VALUE
c: CURVE SHOWING 45dB OF C/N VALUE a: CURVE SHOWING 55dB OF C/N VALUE
b: CURVE SHOWING 50dB OF C/N VALUE
c: CURVE SHOWING 45dB OF C/N VALUE

METHOD OF MAKING A MAGNETO-OPTICAL RECORDING MEDIUM THAT INCLUDES A LIGHT INTERFERENCE LAYER HAVING SPECIFIED CHARACTERISTICS

This application is a continuation of prior application Ser. No. 07/391,643 filed Aug. 7, 1989, now abandoned, which is in turn a continuation of application, Ser. No. 06/940,344, filed Dec. 11, 1986, now abandoned.

BACKGROUND OF THE INVENTION

1. Field of the Invention

This invention relates to a magneto-optical recording medium for use in a magneto-optical memory, magnetic printing, a display element, etc. and to a magneto-optical information reproducing system for reading out information recorded on such a medium by the use of the magneto-optical effect such as a magnetic Kerr effect or the Faraday effect.

2. Related Background Art

Magneto-optical recording mediums for effecting read-out by the utilization of the magneto-optical effect, are known using polycrystal thin films such as MnBi or MnCuBi, non-crystalline thin films such as GdFe, GdCo, TbFe, DyFe, GdTbFe, TbFeCo, TbDyFe, GdTbCo, GdTbFeCo, GdTbFeGe, TbFeCoBi or TbSmFeCo, or single crystal thin films such as GdIG or GdBiIG. Of these thin films, said non-crystalline thin films have recently been considered to be excellent for use as magneto-optical recording mediums when the film forming property with which a large area of thin film is made and the writing efficiency for writing signals with small photo-thermal energy are taken into account.

However, such a known magneto-optical recording medium has suffered from a problem. Because the aforementioned magneto-optical effect is small, the C/N (carrier signal/noise) ratio when information is reproduced is small. To solve such a problem, there have heretofore been proposed mediums in which an anti-reflection layer is provided on the light incidence side of the magnetic recording layer or in which a light reflecting layer or a light interference layer and a light reflecting layer are provided on that side of the magnetic recording layer which is opposite to the light incidence side (for example, U.S. Pat. No. 4,466,035, etc.).

However, even in the mediums as described above, no detailed analysis has been made about the specific structure such as film thickness, and the best use of the characteristic features of the mediums has not been made.

SUMMARY OF THE INVENTION

It is an object of the present invention to solve the above-noted problem peculiar to the prior and to provide a magneto-optical recording medium optimized to obtain a maximum reproduction C/N ratio and a magneto-optical information reproducing system using such medium.

The above object of the present invention is achieved by constructing a magneto-optical recording medium having, in succession along one direction, a recording layer comprising a magnetic thin film, a light interference layer and a light reflecting layer and capable of reading out information magnetically recorded on the recording layer by the use of the magneto-optical effect by applying a reproducing light beam thereto and detecting the reflected light beam thereof by means of a photodetector, so that the following condition is satisfied:

$$d = \frac{\lambda}{2N}\left(\frac{X}{8} + Y\right),$$

where d is the film thickness of the light interference layer, N is the refractive index of the light interference layer, and $\lambda$ is the wavelength of the reproducing light. Here, Y is 0 or an integer greater than 0, and X is any number within the range of $1 \leq X \leq 3$ or $5 \leq X \leq 7$ if the photodetector has no self-multiplication characteristic, and is any number within the range of $2 \leq X \leq 3.9$ or $4.1 \leq X \leq 6$ if the photodetector has a self-multiplication characteristic.

DESCRIPTION OF THE PREFERRED EMBODIMENT

The invention will hereinafter be described in detail with reference to the drawings.

Figure 1:
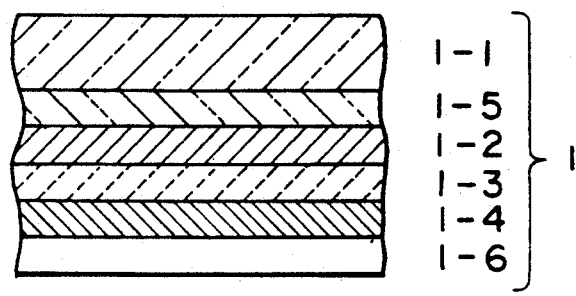
FIG. 1 is a schematic cross-sectional view showing an example of the construction of a magneto-optical recording medium according to the present invention.

FIG. 1 is a schematic cross-sectional view showing an example of the construction of a magneto-optical recording medium according to the present invention. In FIG. 1, reference numeral 1-1 designates a light-transmitting substrate, reference numeral 1-2 denotes a recording layer comprising a magnetic thin film of such a material as described in relation to the prior art, reference numeral 1-3 designates a light interference layer, and reference numeral 1-4 denotes a light reflecting layer. Reference numeral 1-5 designates an underlying layer formed of SiO, SiC, SiN, ZnS, BN (boron nitride), or the like, and reference numeral 1-6 denotes a protective layer formed of SiO, SiC, SiN, ZnS, BN, or the like. A dielectric material similar to that of the underlying layer 1-5 can be used for the light interference layer 1-3. A metal such as Al, Ag, Cu or Au is suitable for the reflecting layer 1-4.

Figure 2:
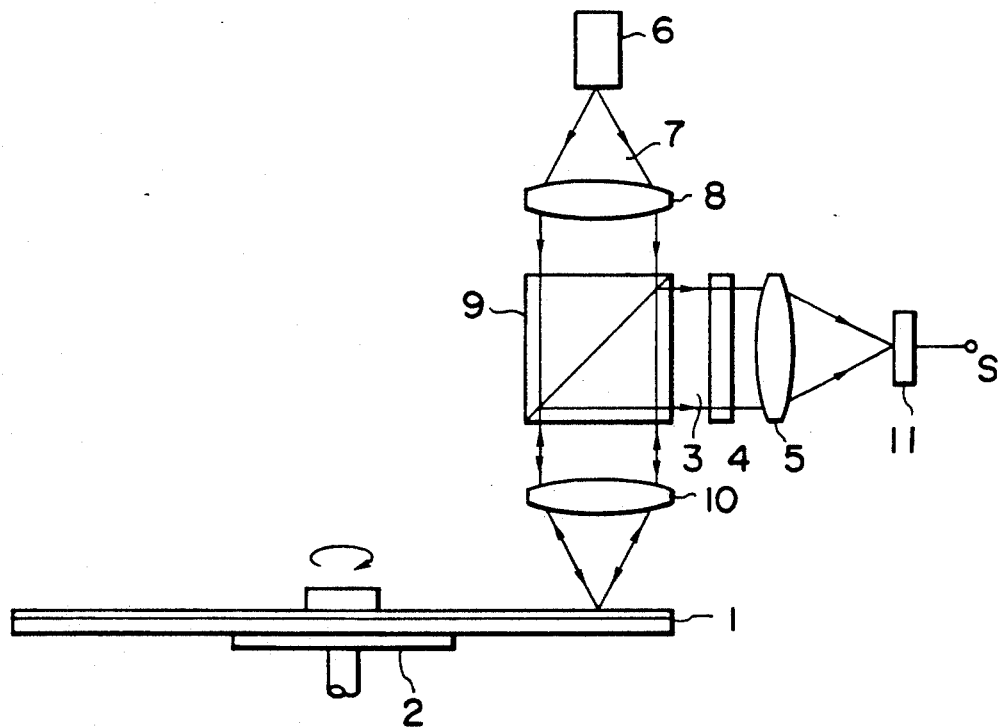
FIG. 2 is a schematic view showing an example of the construction of a magneto-optical information reproducing system using the medium of FIG. 1.

FIG. 2 is a schematic view showing the construction of a magneto-optical information reproducing system using the magneto-optical recording medium shown in FIG. 1. In FIG. 2, a light beam 7 emitted from a semiconductor laser 6 and polarized in a predetermined direction is collimated by a collimator lens 8 and enters a polarizing beam splitter 9. The light beam transmitted through the polarizing beam splitter 9 is condensed on the magneto-optical recording medium 1 by an objective 10. The medium 1 comprises a disc-like transparent substrate, and the light interference layer, the magnetic layer, etc. provided thereon as previously described, and is placed on a turntable 2 and rotated in the direction of the arrow. The reflected light beam 3 of the light beam 7 having its plane of polarization rotated in accordance with information magnetically recorded on the medium 1 again passes through the objective 10, is reflected by the polarizing beam splitter 9 and is directed to an analyzer 4. The transmission axis azimuth of the analyzer 4 is inclined (e.g. at 45°) with respect to the predetermined direction, and the reflected light beam 3 transmitted through the analyzer 4 becomes intensity-modulated in conformity with the recorded information on the medium 1. This modulated light is condensed by a sensor lens 5, is photoelectrically converted by a photodetector 11 and is taken out as a reproduction signal S. The photodetector 11 may be one having a self-multiplication characteristic such as an avalanche photodiode (APD) or one having no self-multiplication characteristic such as an Si photodiode, and depending on which of them is used, the optimum film thickness of the light interference layer of the medium differs as will be described later.

The C/N ratio when the information is reproduced from the magneto-optical recording medium 1 is determined by the reflectivity, the Kerr rotation angle, the Kerr ellipse rate and the medium noise of the medium, the thermal noise and the shot noise of the photodetector, and the electrical noise of the reproducing system. Of these, it is the reflectivity, the Kerr rotation angle and the Kerr ellipse rate that vary by the layer construction of the medium and therefore, the actually measured values were used as the other items and the values theoretically calculated from the layer construction were used as the reflectivity, the Kerr rotation angle and the Kerr ellipse rate, whereby the C/N value of the magneto-optical recording medium was calculated. (The method of calculation is known from Ishiwata and Tomita: Manuscripts Prepared for the National Meeting of the Electrical Society, 1985, pp. S.3-9 to S.3-12.)

Figure 3:
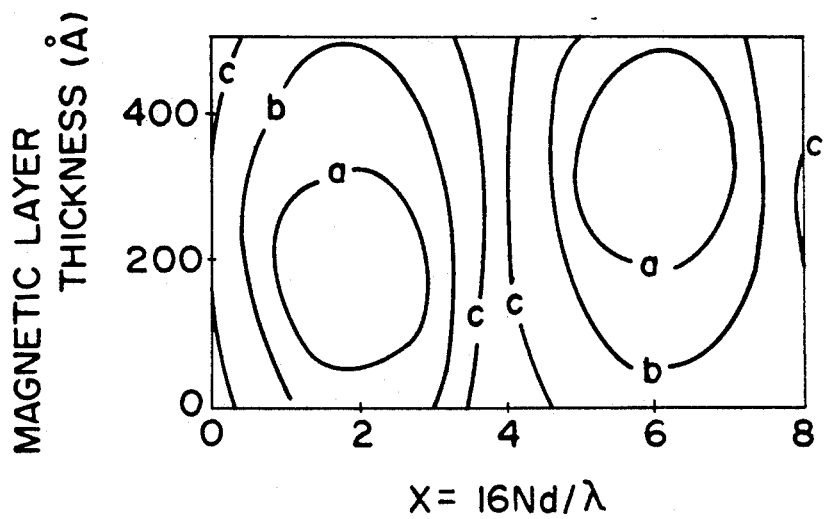
FIG. 3 is a graph showing the C/N value relative to the film thicknesses of a recording layer and a light interference layer when a photodetector having no self-multiplication characteristic is used.

In FIG. 3, the result of the calculation of the C/N value, when the film thickness of the recording layer 1-2 and the film thickness of the light interference layer 1-3 were varied by using a photodetector having no self-multiplication characteristic such as an Si photodiode as the photodetector for reproduction, is shown relative to the film thicknesses of the two layers.

In FIG. 3, the ordinate directly shows the film thickness of the recording layer 1-2, while the abscissa shows the film thickness by X correlated to the film thickness d of the light interference layer. X is the parameter when the film thickness d of the light interference layer is represented by the following equation (1):

$$d = \frac{\lambda}{2N}\left(\frac{X}{8} + Y\right)(Y = 0, 1, 2, 3, \ldots), \quad (1)$$

and for Y=0, $$d = \frac{\lambda X}{16N},$$

and X is proportional to d.

The film thickness conditions of the recording layer 1-2 and the light interference layer 1-3 suitable to obtain a great C/N value during reproduction are seen from FIG. 3. That is, judging from FIG. 3, when a magneto-optical recording medium having at least the recording layer 1-2, the light interference layer 1-3 and the light reflecting layer 1-4 provided on the substrate 1-1 is to be reproduced by a reproducing system using a photodetector having no self-multiplication characteristic, it is necessary to use a magneto-optical recording medium in which the film thickness of the light interference layer 1-3 equals to the value obtained when any X in the range of $1 \leq X \leq 3$ or $5 \leq X \leq 7$ and Y prescribed in the following are substituted in the aforementioned equation (1). The value of Y to be substituted into equation (1) is Y=0, 1, 2, 3, ... and the light interference layer 1-3 is optically equivalent and therefore, not only 0, but also any integer greater than 0 is permitted. However, from the viewpoint of practical use, it is preferable that Y be selected from among 0, 1 and 2.

It is also seen from FIG. 3 that it is preferable that the film thickness of the recording layer 1-2 be in the range of 100–400Å.

On the other hand, recording on such a magneto-optical recording medium is generally accomplished by applying thereto an energy beam modulated in conformity with information and locally heating the recording layer thereof. In this case, it is desired that the magneto-optical recording medium have a good recording sensitivity. Taking it into account that in the magneto-optical recording medium 1, the factors which aggravate the recording sensitivity include an increase in the film thickness of the recording layer 1-2 and the escape of heat resulting from the heat conduction to the light reflecting layer 1-4, it is preferable that the film thickness of the recording layer 1-2 of the recording medium be 500Å or less and the film thickness of the interference layer 1-3 be 100Å more in order to intercept the escape of heat to the light reflecting layer 1-4.

Description will now be made of the layer construction of a magneto-optical recording medium which can be suitably utilized for the reproduction using a photodetector having a self-multiplication characteristic.

Figure 4:
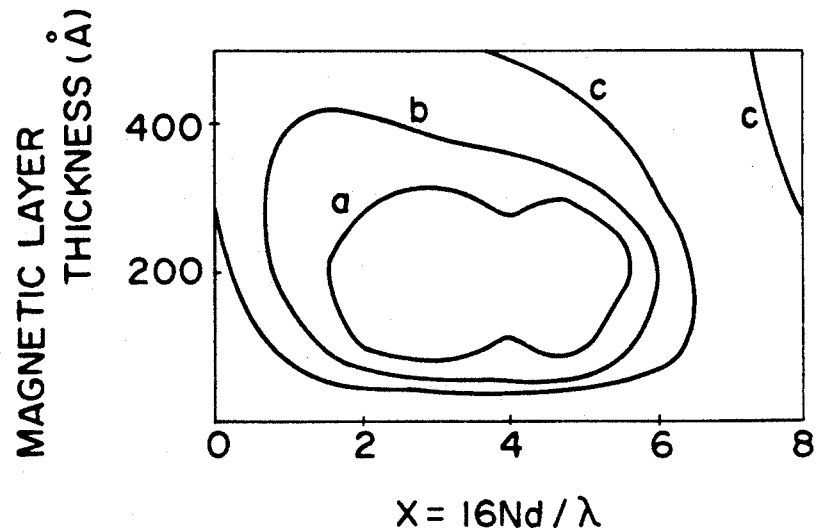
FIG. 4 is a graph showing the C/N value relative to the film thicknesses of the recording layer and the light interference layer when a photodetector having a self-multiplication characteristic is used.

The result of the calculation of the C/N value, when a photodetector having a self-multiplication characteristic such as an avalanche photodiode was used as the photodetector and the film thickness of the recording layer 1-2 of the magneto-optical recording medium 1 and the film thickness of the light interference layer 1-3 were varied, is shown in FIG. 4. From this Figure, the value of X which provides a good C/N value can be determined. From FIG. 4, it is found that when the reproduction utilizing a photodetector having a self-multiplication characteristic such as an avalanche photodiode or a photoelectric multiplication tube is to be carried out, it is necessary to use a magneto-optical recording medium in which the film thickness of the light interference layer 1-3 is equal to the value obtained by substituting into equation (1) a value of X within the range of $2 \leq X \leq 3.9$ or $4.1 \leq X \leq 6$ and a value of Y prescribed by the following. Again in this case, the value substituted for Y is selected from among 0 and integers greater than 0, and preferably from among 0, 1 and 2. The film thickness of the recording layer 1-2 may preferably be 100–300Å in order to be a good C/N value.

Also, when reproduction is to be effected by the use of a photodetector having a self-multiplication characteristic, it is preferable to use a recording medium of good recording sensitivity. Accordingly, the film thickness of the recording layer 1-2 may preferably be set to 500Å or less and the film thickness of the light interference layer 1-3 may preferably be set to 100Å or less.

Also, when reproduction is to be effected by the use of either photodetector, too great a thickness of the light interference layer 1-3 would cause noise and therefore, the film thickness of the light interference layer 1-3 may preferably be selected within an upper limit of 5000Å or so.

Characteristic Evaluation Experiment

In order to verify the foregoing result, a plurality of magneto-optical recording mediums as shown in FIG. 1 where made in the following manner and the characteristic evaluation of each was carried out. On a planar glass having a diameter of 200 mm and a thickness of 1.15 mm, a glass 2p (photopolymer) plate provided with a pregrooved photo-setting resin layer having a thickness of 50 μm was placed as the substrate 1-1, and ZnS as the underlying layer 1-5 was evaporated to a thickness of 1000Å thereon by electron beam heating. Subsequently, GdTbFe was formed to a film thickness of 200Å thereon by sputtering using a high-frequency sputter apparatus, whereby the recording layer 1-2 was formed. Then, ZnS as the light interference layer 1-3 was evaporated to a thickness of 100Å. Further, Al as the light reflecting layer 1-4 was evaporated to a film thickness of 500Å, and then SiO as the protective layer 1-6 was evaporated to a film thickness of 4000Å. The medium made in the manner described above was bonded to a protective glass plate similar in shape to the substrate by the use of an adhesive agent, whereby a magneto-optical recording medium was made.

Further, magneto-optical recording mediums were made in the same manner as described above with the exception that the film thickness of the interference layer 1-3 was 200Å, 300Å, 400Å, 500Å, 600Å, 700Å, 800Å, 900Å, 1000Å, 1100Å, 1200Å, 1300Å, 1400Å, 1500Å, 1600Å, 1700Å, 1800Å, 1900Å, 2000Å, 2100Å, 2200Å, 2300Å, 2400Å, 2500Å, 2600Å, 2700Å, 2800Å, 2900Å and 3000Å.

Figure 5:
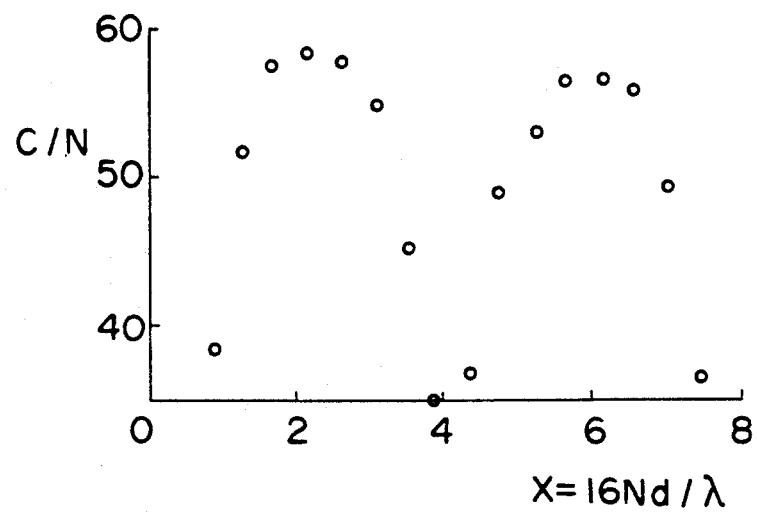
FIG. 5 is a graph in which is plotted the actually measured value of the C/N ratio when various mediums having different light interference layer thickness are used in a system provided with a photodetector having no self-multiplication characteristic.
Figure 6:
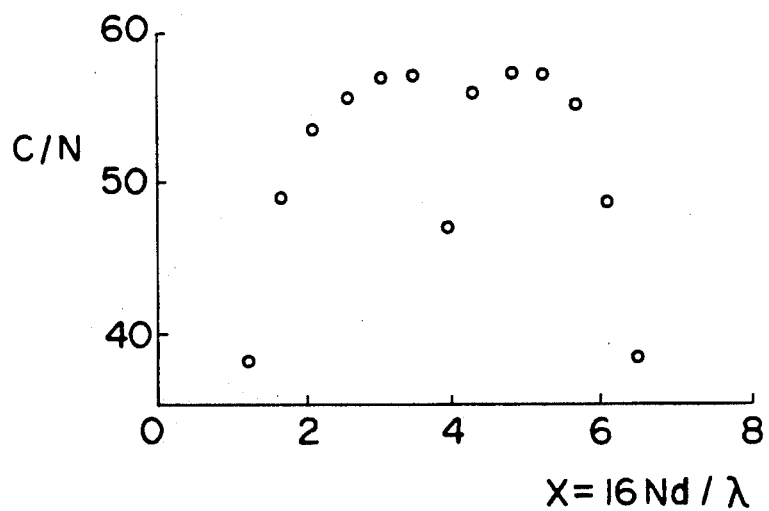
FIG. 6 is a graph in which is plotted the actually measured value of the C/N ratio when various mediums having different light interference layer thickness are used in a system provided with a photodetector having a self-multiplication characteristic.

The characteristic evaluation of these recording mediums was carried out. This evaluation was carried out by effecting recording at a writing output 8 mW, a duty ratio of 50% and a recording frequency of 2 MHz by the use of a semiconductor laser having a wavelength of 830 nm while rotating these recording mediums at 1800 rpm, and measuring the C/N value when the reproduction by a differential system was carried out at a reproduction output of 2 mW by the use of the same semiconductor laser. The C/N value was measured with respect to each of the cases when an Si-PIN photodiode and an APD were used as the photodetector for reproduction. The C/N values for various X values in the case when an Si-PIN photodiode was used as the photodetector are shown in FIG. 5, and the C/N values for various X values in the case where an APD was used as the photodetector are shown in FIG. 6. The value of X is obtained by substituting $N=2.3$, $\lambda=830$ nm and the aforementioned various d values into $X=16 Nd/\lambda$.

It is verified by FIG. 5 that as is derived from the result shown in FIG. 3, when an Si-PIN photodiode having no self-multiplication characteristic is used as the photodetector, an excellent reproduction characteristic is obtained if the film thickness of the light interference layer 1-3 is selected from within the range indicated by $$\frac{\lambda}{2N}\left(\frac{X}{8} + Y\right)$$

[$1 \leq X \leq 3$ or $5 \leq X \leq 7$, $Y = 0, 1, 2, \ldots$].

It is also verified by FIG. 5 that as is derived from the result shown in FIG. 3, when an APD having a self-multiplication characteristic is used as the photodetector, an excellent reproduction characteristic is obtained if the film thickness of the light interference layer 1-3 is selected from within the range indicated by $$\frac{\lambda}{2N}\left(\frac{X}{8} + Y\right)$$

[$2 \leq X \leq 3.9$ or $4.1 \leq X \leq 6$, $Y = 0, 1, 2, \ldots$].

The recording mediums thus manufactured were also good in recording sensitivity, because the film thickness of the recording layer 1-2 was 500Å or less and the film thickness of the light interference layer 1-3 was 100Å or more.

What is claimed is:

1. A method of making a magneto-optical recording medium for having information magnetically recorded on its recording layer read out by magneto-optical effect by applying a reproducing light beam emitted from a semiconductor laser thereto and detecting the reflected light beam thereof by means of a photodetector having no self-multiplication characteristic, said method comprising the steps of:

selecting a recording layer comprising a magnetic film;

selecting a light interference layer comprising a dielectric;

defining the thickness of the light interference layer by:

$$d = \frac{\lambda}{2N}\left(\frac{X}{8} + Y\right)$$

where d is the film thickness of said light interference layer, N is the refractive index of said interference layer, and λ is the wavelength of the reproducing light, wherein $1 \leq X \leq 3$ or $5 \leq X \leq 7$, and Y is selected from 0, 1 and 2;

selecting a light reflecting layer; and arranging the recording layer, the light interference layer and the light reflecting layer in succession along one direction to form the magneto-optical recording medium.

2. A method of making a magneto-optical recording medium according to claim 1, further comprising defining the film thickness of said recording layer to be at most 500Å.

3. A method of making a magneto-optical recording medium according to claim 2, wherein the film thickness of said recording layer ranges from 100Å up to and including 400Å.

4. A method of making a magneto-optical recording medium according to claim 1, further comprising selecting a light transmitting substrate and successively providing the recording layer, the light interference layer and the light reflecting layer of said medium on said light-transmitting substrate.

5. A method of making a magneto-optical recording medium according to claim 4, further comprising providing the recording medium with an underlying layer between said substrate and said recording layer.

6. A method of making a magneto-optical recording medium according to claim 4, further comprising providing the recording medium with a protective layer on that side of said light reflecting layer which is opposite to said substrate.

7. A method of making a magneto-optical recording medium for having information magnetically recorded on its recording layer read out by magneto-optical effect by applying a reproducing light beam emitted from a semiconductor layer thereto and detecting the reflected light beam thereof by a photodetector having a self-multiplication characteristic, said method comprising the steps of:

selecting a recording layer comprising a magnetic film;

selecting a light interference layer comprising a dielectric;

defining the thickness of the light interference layer by:

$$d = \frac{\lambda}{2N}\left(\frac{X}{8} + Y\right)$$

where d is the film thickness of said light interference layer, N is the refractive index of said light interference layer, and λ is the wavelength of the reproducing light, wherein $2 \leq X \leq 3.9$ or $4.1 \leq X \leq 6$, and Y is selected from 0, 1 and 2;

selecting a light reflecting layer; and arranging the recording layer, the light interference layer and the light reflecting layer in succession along one direction to form the magneto-optical recording medium.

8. A method of making a magneto-optical recording medium according to claim 7, further comprising defining the film thickness of said recording layer to be at most 500Å.

9. A method of making a magneto-optical recording medium according to claim 8, wherein the film thickness of said recording layer ranges from 100Å up to and including 300Å.

10. A method of making a magneto-optical recording medium according to claim 7, further comprising selecting a light transmitting substrate and successively providing the recording layer, the light interference layer and the light reflecting layer of said medium on said light-transmitting substrate.

11. A method of making a magneto-optical recording medium according to claim 10, further comprising providing an underlying layer between said substrate and said recording layer.

12. A method of making a magneto-optical recording medium according to claim 10, further comprising providing a protective layer on that side of said light reflecting layer which is opposite to said substrate.

* * * * *

UNITED STATES PATENT AND TRADEMARK OFFICE
CERTIFICATE OF CORRECTION

PATENT NO. : 5,253,233
DATED : October 12, 1993
INVENTOR(S) : EIICHI FUJII

It is certified that error appears in the above-indentified patent and that said Letters Patent is hereby corrected as shown below:

COLUMN 1:

Line 19, "the" should read --a--, and "a" should read --the--; and
Line 57, "prior" should read --prior art--.

COLUMN 3:

Line 10, "tive 10." should read --tive lens 10.--; and
Line 18, "objective 10," should read --objective lens 10,--.

COLUMN 4:

Line 49, "more" should read --or more--.

COLUMN 6:

Line 2, "where" should read --when--.

Signed and Sealed this

Thirty-first Day of May, 1994

Attest:

*Attesting Officer*

BRUCE LEHMAN

*Commissioner of Patents and Trademarks*